Sept. 7, 1965  C. D. FOURÉ ET AL  3,205,147
PROCESS AND DEVICES OF HEAT EXCHANGE
AND NUCLEAR REACTOR EMBODYING SAME
Filed March 28, 1961  14 Sheets-Sheet 9

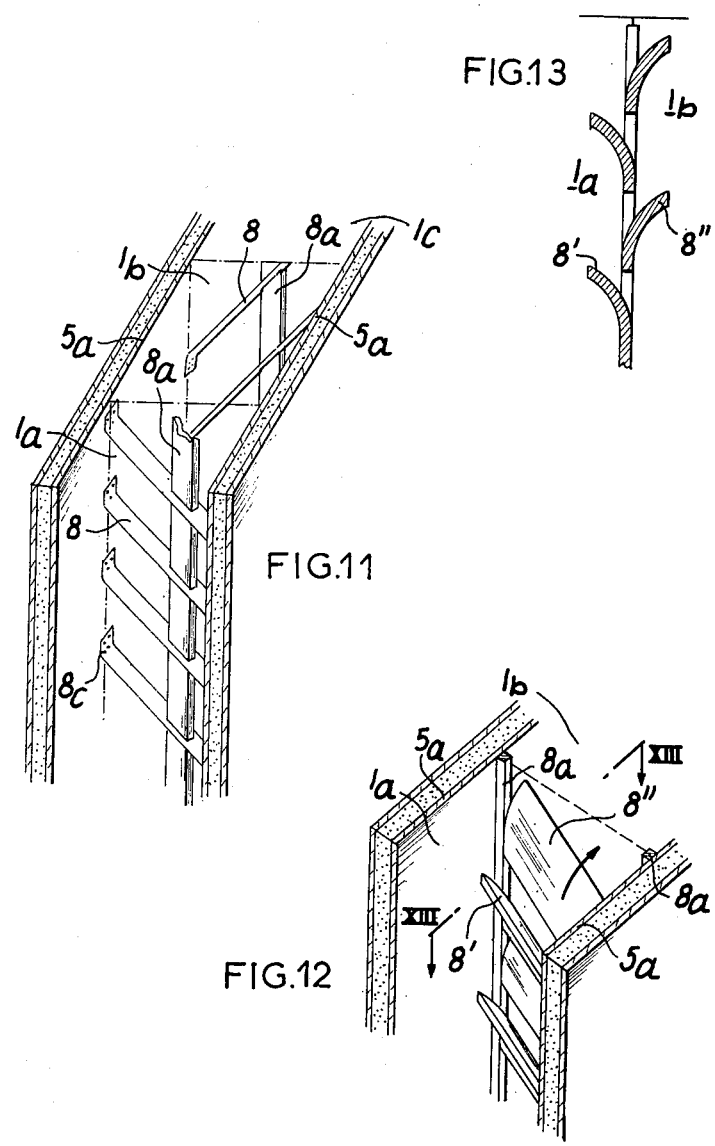

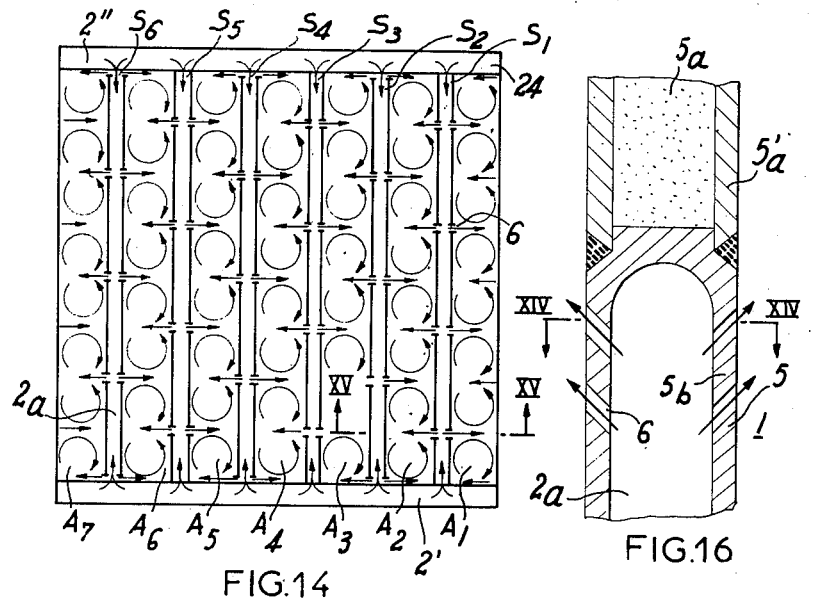
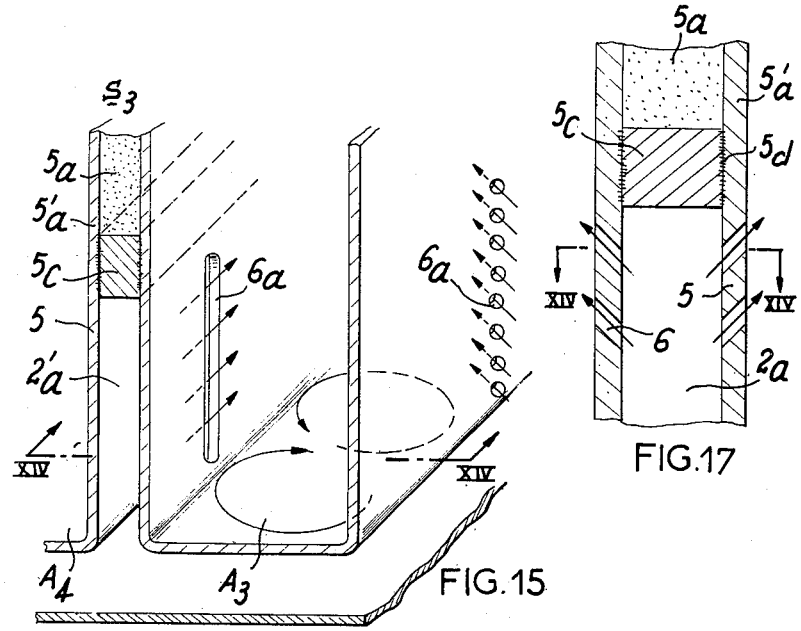

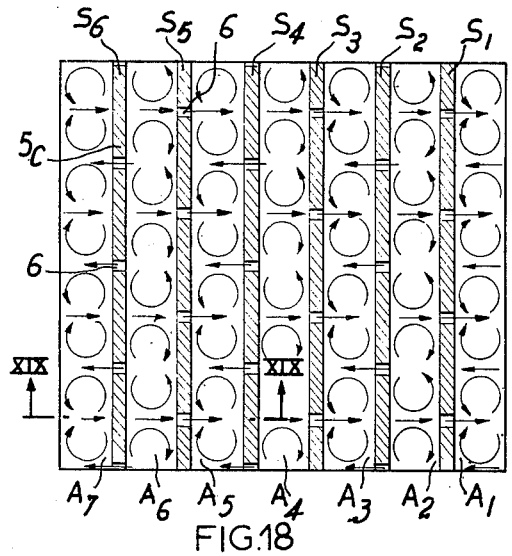
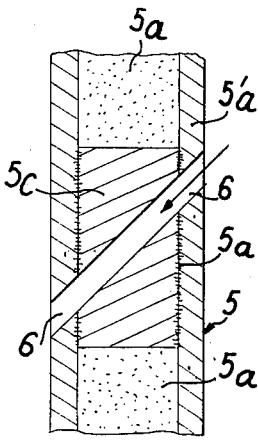
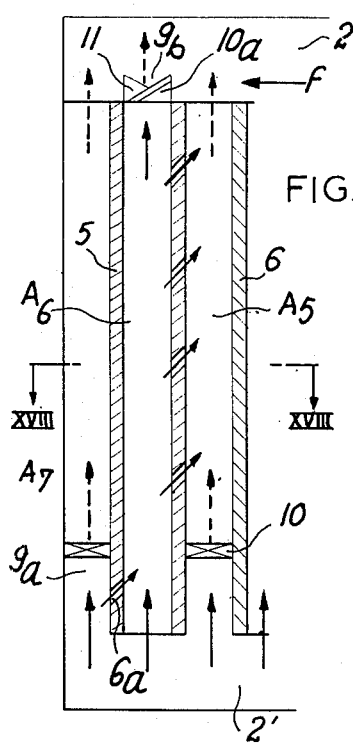
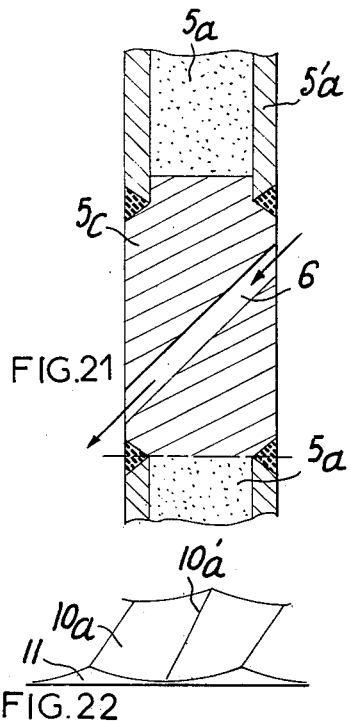
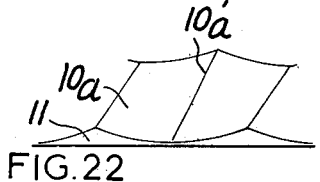

Sept. 7, 1965 C. D. FOURÉ ET AL 3,205,147
PROCESS AND DEVICES OF HEAT EXCHANGE
AND NUCLEAR REACTOR EMBODYING SAME
Filed March 28, 1961 14 Sheets-Sheet 10

INVENTORS
CLAUDE DÉSIRÉ FOURÉ
ARLETTE MARCELLE MIHAIL
BY
Cameron, Kerkam & Sutton
ATTORNEYS Sept. 7, 1965  
C. D. FOURÉ ET AL  
3,205,147  
PROCESS AND DEVICES OF HEAT EXCHANGE  
AND NUCLEAR REACTOR EMBODYING SAME  
Filed March 28, 1961  
14 Sheets-Sheet 11
Fig. 32.
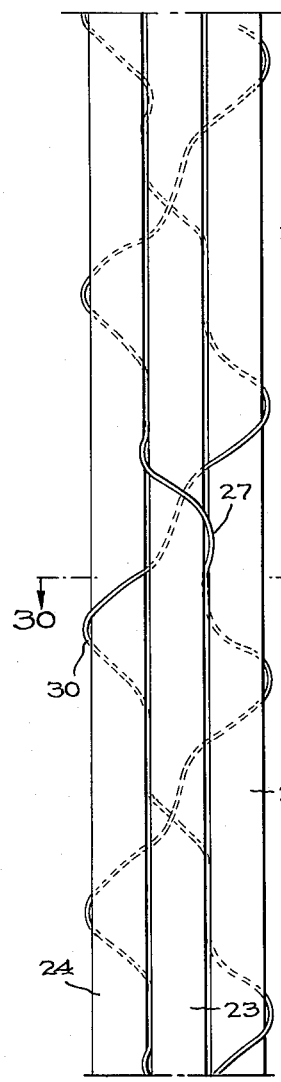
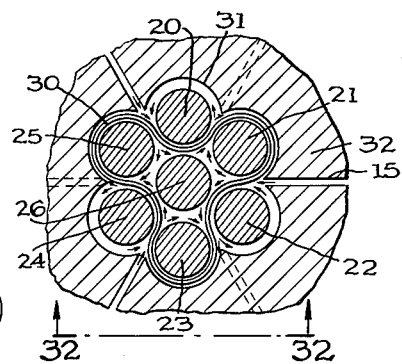
Fig. 30.
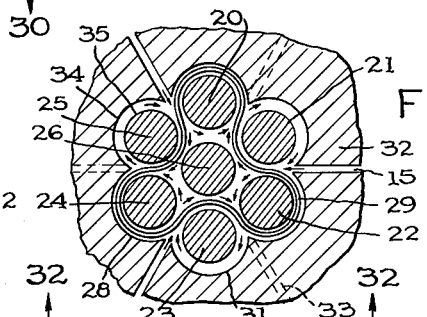
Fig. 31.
INVENTORS  
CLAUDE DÉSIRÉ FOURÉ  
ARLETTE MARCELLE MIHAIL  
BY  
Cameron, Kerkam & Sutton  
ATTORNEYS Sept. 7, 1965 C. D. FOURÉ ET AL 3,205,147
PROCESS AND DEVICES OF HEAT EXCHANGE
AND NUCLEAR REACTOR EMBODYING SAME
Filed March 28, 1961 14 Sheets-Sheet 12
Fig. 33.
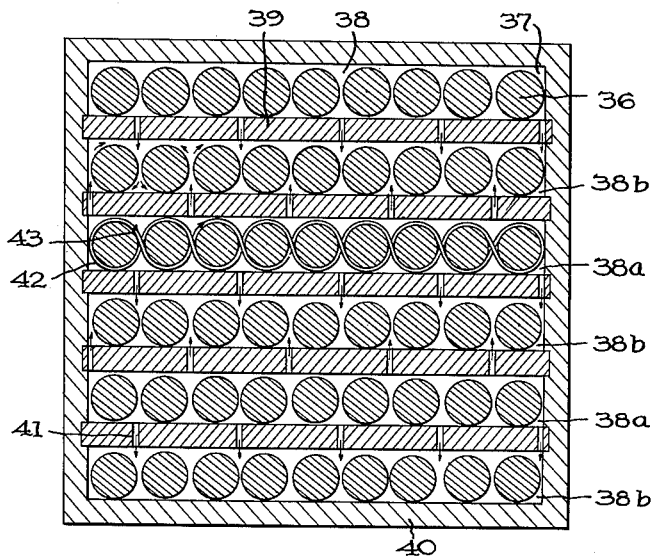
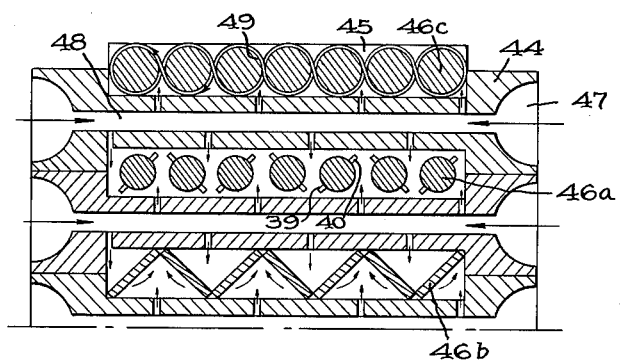
Fig. 34.
INVENTORS
CLAUDE DE'SIRE FOURÉ
ARLETTE MARCELLE MIHAIL
BY
Cameron, Kerkam & Sutton
ATTORNEYS

United States Patent Office 3,205,147
Patented Sept. 7, 1965

3,205,147
PROCESS AND DEVICES OF HEAT EXCHANGE AND NUCLEAR REACTOR EMBODYING SAME
Claude Désiré Fouré, Courbevoie, and Arlette Marcelle Mihail, Asnieres, France, assignors to Societe Nationale d'Etudes et de Construction de Moteurs d'Aviation, Paris, France
Filed Mar. 28, 1961, Ser. No. 98,983
Claims priority, application France, Mar. 21, 1959, 790,055; Dec. 9, 1959, 812,593, 812,594; Apr. 1, 1960, 823,155
9 Claims. (Cl. 176—61)

This application is a continuation-in-part of our co-pending application Serial No. 16,040, filed March 18, 1960, now abandoned.

Various processes and apparatus have already been proposed with a view to improving the value of the co-efficient of thermal exchange between a wall and a fluid circulating along such wall by creating local turbulences in the vicinity of the exchange wall, which have as a consequence a reduction of considerable proportion in the limiting layer.

Among these known devices is a first type, in which all the charge of the fluid is introduced into the exchange channel by jets directed towards the exchange wall. This category includes, for example, the device described in No. 47 of September 1955 of "La Recherche Aeronautique."

In a second category of known devices, such as those described in French Patent No. 1,160,115 of October 26, 1956, for example, only a fraction of the exchange fluid charge is introduced into the channel in the form of jets which serve to create, along the exchange wall, a turbulence which modifies the limiting layer.

However, in all the devices of this type, the turbulence created is disorderly, that is to say, the locally existing eddies are unstable and their degeneration causes a useless dissipation of energy. Also, it consequently occurs that secondary eddy movements caused by the jets are incoherent and thus cause an excessive charge and an excess feed pressure higher than that of the jets impinging on the exchange surface, with a view to producing the desired effect there. In accordance with the present invention, the applicants have found that it is possible, by organizing the turbulent system in a stable and coherent manner, to increase advantageously the thermal co-efficient or even to obtain the same effect in a more economical manner.

It has also been known in fact that the penetration of a jet into a flow is easier than into the trajectory of another jet and, even more, of a row of jets preceding it.

It is apparent, and the invention systematically uses this characteristic, that there is a considerable advantage in that the position of the rows between them are such that they induce a certain number of eddies extending along these rows, in such manner that they have compatibility in their sense of rotation, on the one hand, with the adjacent eddies and, on the other hand, between the rows and the eddies.

The process of exchange according to the invention is characterized in that a space or exchange chamber where the fluid flows is constituted by a plurality of joined elementary chambers, each extending over the whole length of the exchange chamber, traversed by a fluid in rotation, the sense of which is maintained along all of each elementary chamber, a part of the lateral surface of each elementary chamber being constituted by a part of the exchange wall limiting the exchange chamber, while another part at least of this lateral surface is common with a part of the lateral surface of an adjacent elementary chamber, along which part the two adjacent elementary chambers are in intercommunication, the fluid particles in rotation in each of these elementary chambers having substantially the same vectorial speed and the rotation of fluid in each elementary chamber being obtained by means of apertures provided in the walls of the elementary chamber and/or by means of deflector members.

In the first case, such apertures allow entry of jets of fluid tangentially with respect to each elementary chamber, in the sense of introduction or in the sense of removal; these jets, which are eventually discontinuous, are directed according to the unique sense of rotation to the elementary chamber. The term "jet" should be understood in its general sense as designating both a longitudinal assembly of jets or a jet of elongated transverse section. The fluid of the jets is delivered from an inlet space or passes out of an outlet space, the pressure in these spaces, in the vicinity of each aperture, being respectively above and below that prevailing in the elementary chamber.

In the second case, the deflector members are disposed within the fluid flowing in each elementary chamber and a motive difference of pressure is established between the opposed extremities of the different elementary chambers.

In a general manner, each elementary chamber includes a median line which may be curved, partial or closed; all the median lines have substantially the same family of normal planes; each of the elementary chambers is defined also in each of the normal planes to its median line by a polygonal contour, the edges of which are curvilinear, if required. If the median longitudinal line of the exchange chamber is not rectilinear, the median line of each elementary chamber, according to the invention, may be substantially parallel to the median line of the exchange chamber; this median line can equally describe a helix of large pitch around the median line of the exchange chamber, that is to say, whether it is rectilinear or not.

On each polygonal contour, the sense of the trajectory for the fluid which circulates in the elementary chamber corresponds to a single sense of rotation around the median line and the sense of the travel along the common interface is the same for the two elementary chambers which define this interface; the planes normal to the median lines are all traversed in the same sense by the flow of the fluid, relative to different elementary chambers of the exchange chamber.

In the whole plan of the section normal to the median line of an elementary chamber, the polygonal contour, according to the invention, is contained between two circles, the diameter of the smaller being at least equal to half of the diameter of the larger and the apex angles of each polygonal contour being between 60° and 180°.

In a continuous displacement of the section plane, along the median line, the contours maintain substantially the same form and are derived in a continuous manner substantially one from another by homotheticity and affinity with respect to the median line and, if required, with slight rotation around this median line.

In fact, the peripheral contour assigned to the elementary chambers may be slightly elongated from a circle so that each can contain a single stable eddy and do not tend to decompose into secondary eddies uselessly dissipating the energy.

All these elementary chambers should preferably have the same form and the same dimensions.

On the other hand, if the exchange chamber is annular and without transverse separation, the number of elementary chambers should necessarily be given; if this annular exchange chamber comprises a single layer of elementary chambers, it is necessary for the distance separating the median lines of two adjacent chambers to be substantially equal to the local distance of the walls of the exchange chamber; if this annular exchange chamber comprises two layers of elementary chambers, it is necessary for the total number of chambers to be a multiple of four and for the distance separating the median lines of the two elementary chambers in one layer, added to the distance separating the median lines of the two adjacent elementary chambers relating to the other layer, to be substantially equal to the local distance of the walls of the exchange chamber.

If the exchange chamber is a circular cylinder, it is necessary for the number of elementary chambers to be lower and preferably equal to six. In the contrary case, there is the appearance of a central-axial flow which does not participate in exchanges.

If the exchange chamber is cylindrical and of square section, the number of elementary chambers should be equal to four.

If the exchange chamber is rectangular, it is necessary for the number of elementary chambers either to be the same with respect to the size of the small edge (for a single layer of elementary chambers) or twice the size (for two layers of elementary chambers).

In the case where the rotation is obtained by means of jets, all the elementary chambers should preferably be supplied through the same number of jets (or fractions of jets), since the same jet can supply two chambers if it is produced along the interface common to two elementary chambers.

The process according to the invention allows a stable and coherent turbulent state to be obtained, the degeneration of which does not need to be feared and the maintenance of which is assured.

The process according to the invention, with respect to known processes, has the following advantages, which are particularly interesting in the case where the walls of the exchange chamber are thermal exchange walls.

The thermal limiting layer which is set up at the periphery of each elementary chamber, on the exchange wall or walls, has its development interrupted along the common borders with the adjacent elementary chamber and, particularly, in the case where the rotation is obtained by means of jets on contact of each jet.

The limiting contact layer is interrupted in the same manner and the speeds increase in the immediate vicinity of the wall.

The beneficial modification of the curve of speeds and temperatures along the wall which is recognized in the movement of rotation is much larger as the shape of the curve is weaker (advantage of the multiplicity of elementary chambers).

The rotation is possible and economical even for exchange channels of complex form differing from the circular form. The rotation is maintained by jets and/or deflector members.

The effect of rotation is facilitated by the fact that all the jets and/or all the deflector members co-act to give the same turbulence system (economy of loss of charges) and by the fact that such jets penetrate into the zones where the speed of flow is parallel to them (which is transformed by economy of charge in the case, which is particularly advantageous, where the output of the inlet jets and/or the output of the outlet jets represent a positive relatively low fraction of the output of fluid flowing in the exchange chamber).

The operation of the exchange process described above is effected in practice by means of apparatus which will be defined below and which should be considered to form part of the present invention.

According to the invention, each tangential jet mentioned above can be obtained by means of a passage, orifice, nozzle or window, interconnecting an inlet space or an outlet space for fluid and the exchange chamber; in particular, this space can be a cylindrical, annular or other casing, parallel to the elementary chambers; the axis of the opening corresponding to each jet is substantially tangential to the polygonal contour of an elementary chamber (in particular a part common to the polygonal contours of two adjacent elementary chambers), of such a kind that the direction and sense of the jet which traverses this aperture are those which should exist for compatibility of the rotations in the adjacent elementary chambers.

The openings can be of more or less continuous form; when they have the form of simple openings, they should be elongated along the line on the walls of the interface common to two adjacent elementary chambers.

A tangential jet along an interface can likewise be obtained, according to the invention, by the intersection of two concurrent tangential jets, preferably identical and symmetrical with respect to the plane containing the axis of the desired jet. The openings in the walls can then be gills or louvre openings giving an assembly of jets along these walls.

The direction given to the flow in the jet is advantageously inclined, according to the invention, in the sense of the general flow in the exchange chamber, since in addition to the advantages with respect to the quantity of movement already known, a better longitudinal separation of the destructive action on the limiting layer of each jet is thus given and approximate parallelism between the direction of the speed of the jet and that of the local speed at the periphery of the elementary chamber or chambers (helicoidal movement).

In a general manner, the openings corresponding to two adjacent elementary chambers are disposed in a substantially symmetrical manner with respect to the common interface of these chambers and are divided by a wall having parts corresponding to each of such chambers, along the symmetrical generatrices with respect to this interface, in order to ensure the stability of the elementary chambers.

With what has already been said in relation to obtaining jets at the orifices and what has been stated above with respect to the position of these jets and the definition of the elementary chambers (form, dimensions and sense of rotation), a person skilled in the art can readily define the position of the orifices in each particular case.

According to the invention, the rotation of the fluid can likewise be obtained, within the different chambers, by means of deflector members; these are disposed either within each elementary member in such a manner as to include all the volume defined by such chamber or along at least two opposed suitably chosen faces of these chambers; these two types of deflector member can equally be utilized in combination.

In a first arrangement, relating to this case, the deflector members of an elementary chamber can be constituted for example by one or more bands applied substantially on the median line of the chamber under consideration and curved helicoidally around this median line; in a section normal of this median line, the outlines of these bands extend in a substantially radial manner from the outline of the median line in the direction of the polygonal contour delimiting the elementary chamber and preferably adjacent this contour; the sense of curvature of the bands of the two adjacent elementary chambers should necessarily be opposite.

The angles between the outlines of the different bands in this normal section are preferably equal; the number of bands in each elementary chamber of the same chamber is preferably the same and the number of pitches between any two normal planes common to all elementary chambers of the same chamber is preferably the same for all the bands contained in such chamber, without however it being necessary for the pitch to be constant along each band; it is possible for instance progressively to vary the pitch of each band, particularly in order to reduce the losses of charge to a minimum compatible with the local thermal conditions which are required.

According to a second arrangement, the deflector members disposed on at least two opposed faces of the elementary chambers constituting a given exchange chamber are, for example, flat deflector grilles disposed at the interface common to two adjacent elementary chambers.

In the two previous arrangements, each elementary chamber is connected at one of its ends to an outlet conduit and at the other end to an inlet conduit.

According to another feature of the invention, the means envisaged, such as deflector members or apertures in the walls, for rotation of the fluid in each elementary chamber, can be employed in combination, the choice of these two means depending essentially on the application in view.

The present invention applies principally to heat exchange, for example between a fluid and a wall (heating or cooling of the fluid) or between two fluids with an intermediate wall; in the case where the rotation is effected by means of jets, the nature and state of the fluid utilized in the jets can be the same as those of the fluid which passes through the channel or can be different; the jets can in particular be liquids (water) and the flow mainly gaseous (water vapor); in the case where the more dense phase is centrifuged to the periphery of the turbulences (suppression or retardation of heating and vapor pockets limiting the exchange affecting the stability of the state and the safety of the walls); the vapor phase is thus collected along the axis of the turbulences freed from all liquid particles in suspension, which, if the contained heat with respect to the loss of liquid is sufficient for water to be superheated, permits superheated dry vapor to be obtained directly at the outlet of the exchange chamber; the jets can be vapor jets if the channel is a vapor condenser channel.

The invention has a very interesting application in the realm of atomic piles, in the case where the exchange chamber is an atomic pile channel and the exchange wall is the container for a fuel element.

The use of a single exchange chamber gives an improvement in the operation of numerous types of heat exchangers, but limits the number of solutions of certain problems, such as those which arise, for example, in nuclear reactors cooled by boiling liquid where the nuclear fuel is in a very sub-divided form, most often in the form of thin plates or bars of small diameter in compact assemblies.

According to a particularly important arrangement of the invention, an assembly of exchange chambers is produced.

Each of the exchange chambers, constituted by a plurality of elementary chambers such as defined above, is thus separated from the adjacent exchange chambers by structures comprising apertures or conduits for the passage of the tangential jets of fluid previously defined. These structures can contain a medium, which is fluid or solid, in thermal exchange with the fluid circulating in the exchange chambers. The apertures or conduits provide this passage either between an inlet or outlet casing for the fluid delivered by the jets, the casing being incorporated in one of the structures, and the exchange chambers adjacent this structure (type $a$), or between two adjacent exchange chambers where different pressures prevail (type $b$).

In the type $a$, the number and position of the passages between the casing incorporated in a structure and any one of the exchange chambers adjacent this structure should obey the conditions already defined, the number and/or position being different from one to the other of the chambers.

On the other hand, in the type $b$, the number and position of the apertures or conduits intercommunicating two exchange chambers adjacent the same structure necessarily correspond; there is thus an obligatory correspondence between the hydrodynamic states created in the exchange chambers.

In the type $b$, two exchange chambers in communication are referred to as distributor and receptor exchange chambers, the first being that of the two where the pressure is the higher.

All receptor exchange chambers can also operate as distributor exchange chambers with respect to the adjacent exchange chambers. In a general manner, the associations of exchange chambers can be arranged such that one of these chambers is a distributor for one or more receptor chambers or is a receptor for one or more distributor chambers.

Both in the type $a$ and in the type $b$, each exchange chamber allows a principal direction of flow (along the axis of each elementary chamber) and can be connected upstream to a fluid inlet conduit and/or downstream to a fluid outlet conduit, the inlet and outlet conduits being independent or otherwise.

By way of example of the arrangement according to type $b$, there can be cited the case of an assembly of adjacent exchange chambers each operating as a boiler and the outputs of the various chambers can be connected to different stages of a turbine.

It is also possible, according to the invention, in accordance with what has been said in relation to a single exchange chamber, to arrange deflector members inside all or some of the elementary chambers of an assembly of exchange chambers related to type $a$ or to type $b$; a limiting case corresponds to the absence of apertures or conduits in the structure separating the exchange chambers and to the presence of such deflector members in all the elementary chambers of the assembly.

In a particular embodiment of the invention relating to an assembly of the type $a$, several fluids are used to supply the assembly of exchange chambers, these fluids being in a state of thermal exchange with respect to a fluid or solid medium contained in the structure separating the exchange chambers from one another.

When a single fluid is used to supply the exchange chambers, the invention envisages particularly thermal exchange with a medium contained in the structures.

In another embodiment of the invention, the fluid circulating in the exchange chambers contains a nuclear fuel in solution or in suspension, the associated structures then containing a moderator body of solid or fluid form.

In a general manner, the structure separating the different exchange chambers can be very varied in thickness and material; they can be constituted, for example, by a single wall, which is thick or thin, or by a double wall; this double wall can constitute particularly an inlet casing or outlet casing for a fluid delivered by the jets or can contain a thermal exchange medium constituted by the solid, a fluid or suspension of particles in a fluid, this medium being either fixed or in independent circulation. The double wall can also have the two characteristics in combination.

In particular, the structures separating the different exchange chambers can be or can contain a thermal exchange medium constituted by a nuclear fuel, particularly nuclear fuel of solid form; the distribution of this fuel can be plane when the structures are plane or annular when the structures are cylindrical; the distribution of the fuel can be continuous or discontinuous. Nuclear fuel can also be disposed in other structures not separating two exchange chambers, but situated at the interior of these chambers (in the case of the inner one of concentric annular chambers, for example). The present invention particularly concerns the case where the fluid flowing in the chambers is carried to boiling by the heat which it receives from the structures containing the nuclear fuel. It may be remarked that the resulting advantages of a turbulent state are then utilized to the maximum on the two faces of each structure.

Referring to the diagrammatic FIGS. 1–36 of the accompanying drawings, several embodiments are described below which are given by way of example of the process and devices according to the invention.

In the perspective views of FIGS. 1–7, it is seen that the elementary chambers 1 in accordance with the invention each contain an eddy, the casings 2 supplying the fluid to the jets 3 rotating the fluid in the different elementary chambers 1; the common interface of two adjacent elementary chambers is designated by 4, the wall limiting the exchange chamber by the general reference 5, the apertures in these walls by the reference 6 and the parts of these walls constituting the exchange walls by the reference 5a.

By way of example, one of the exchangers described in FIGS. 1–7, with an output in the jets of the order of 8–13% of the overall output, permits the attainment of a Margoulis number of the order of 40 to $50 \times 10^{-4}$; an annular exchange chamber with smooth walls and of the same characteristics but not provided with devices according to the invention, only produces a Margoulis number of the order of $20 \times 10^{-4}$.

Figure 4:
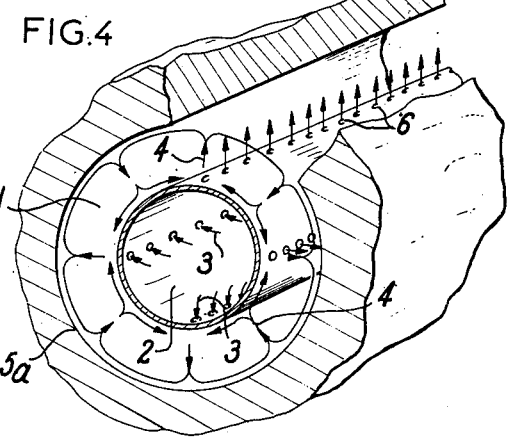

FIG. 4 relates to an exchanger of the cylindrical annular type in which the casing for the supply of fluid to the jets is pierced by four rows of holes 6 following the equidistant rectilinear generatrices for obtaining eight eddies.

Figure 5:
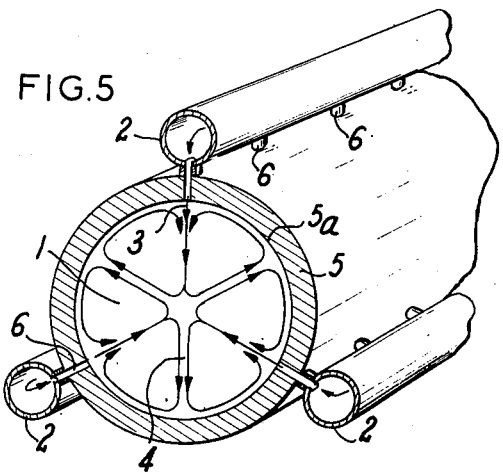

FIG. 5 relates to a tubular exchange chamber in which the fluid of the jets is supplied through three external collectors connected to the chamber by three equidistant rows of inlet pipes directed towards its axis.

Figure 6:
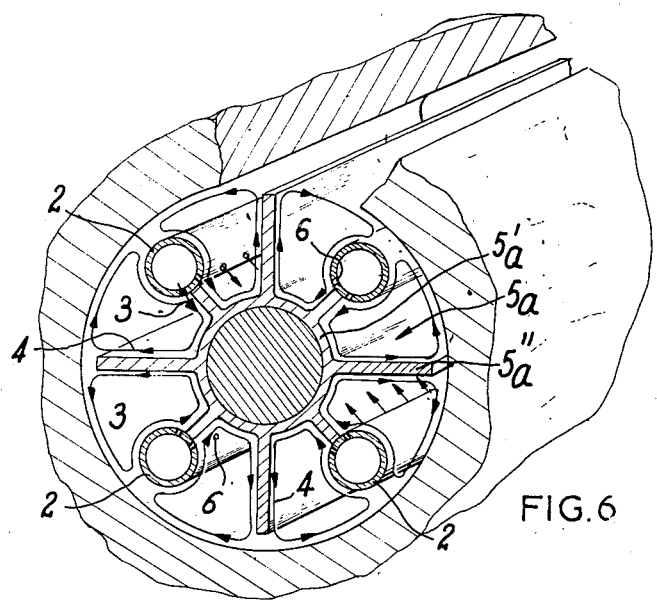

FIG. 6 shows an annular exchanger in which the wall 5a includes a casing 5a' provided with four equidistant fins 5a'', in the bisectors of which are located four casings 2 supplying the fluid to the jets 3, these casings being pierced with orifices 6 directed according to these bisectors towards the centre of the exchanger; a system of eight eddies is thus created which are limited over a part of their lateral surface by the cooling fins 5a''.

Figure 7:
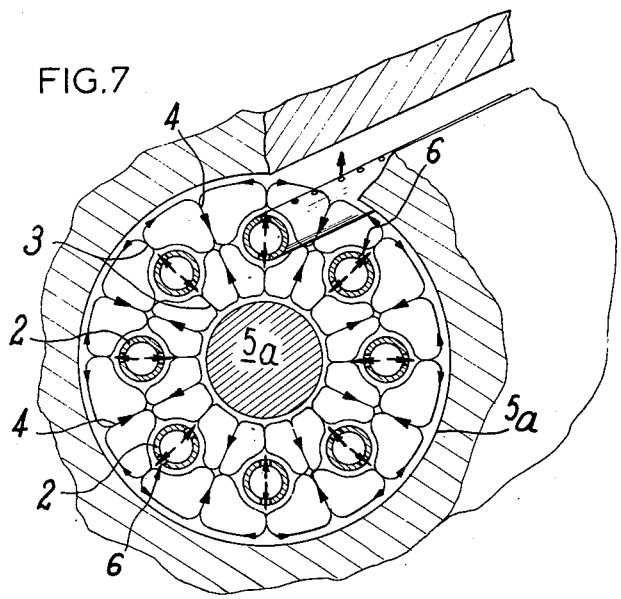

FIG. 7 shows an annular exchanger in which the internal and external walls 5a are both exchange walls, the fluid being supplied by eight casings disposed at 45° to one another around the imaginary median cylinder of the exchange chamber; these casings are each provided with two series of openings 6 disposed along the radii of the exchange chamber and in this manner a system with two layers each of sixteen eddies is obtained.

FIGS. 8–13 relates to the use of deflector means for rotating the fluid.

Figure 8:
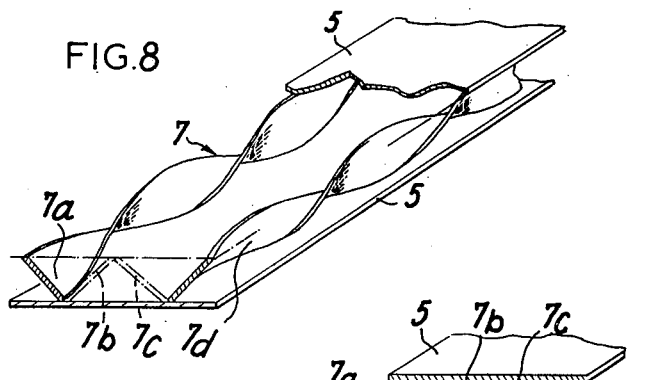

FIG. 8 shows a perspective view of a portion of an exchange chamber limited by plain parallel surfaces, the deflector members being curved bands.

Figure 9:
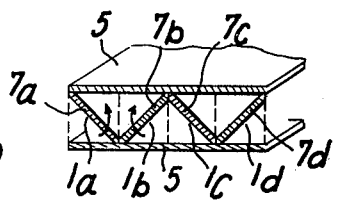

FIG. 9 shows also in perspective the same exchange chamber, but more particularly in transverse section.

Figure 10:
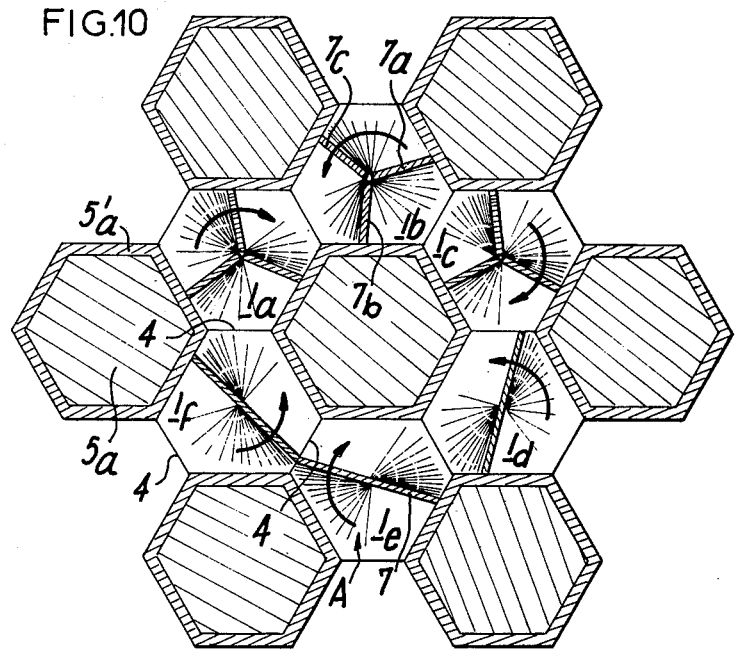

FIG. 10 shows a transverse sectional view of an exchange device comprising an exchange chamber of more complex form, at the inside of which the multi-turbulent state is also obtained by means of curved bands.

FIG. 11 shows a perspective view of a parallelepiped exchange chamber where the deflector means are deflector grilles situated on the common interface of two adjacent exchange chambers.

FIG. 12 shows a perspective view of an analogous device, in which the deflector grilles are of different structure.

FIG. 13 is a view in section along XIII—XIII of FIG. 12.

FIGS. 14–27 relate to assemblies of exchange chambers,

FIG. 14, which illustrates the case of an assembly of exchange chambers of type $a$, is a view in horizontal section according to the line XIV—XIV of FIGS. 15, 16 and 17 of an assembly of plate elements of fuel of a nuclear reactor and of the cooling device for these elements.

FIG. 15 is a perspective view of the base of this assembly, the front part of this perspective being a partial vertical section on the line XV—XV of FIG. 14.

FIGS. 16 and 17 are other, detailed views of the section according to the line XV—XV of FIG. 16.

FIG. 18, which illustrates the case of an assembly of exchange chambers of type $b$, is a view in horizontal section along the line XVIII—XVIII of FIG. 19 of another cooling device for plate elements of fuel in a nuclear reactor.

FIG. 19 is a partial vertical section along the line XIX—XIX of FIG. 18 of the preceding device.

FIGS. 20 and 21 are detailed views of the partial section of FIG. 19.

FIG. 22 is a perspective view according to $f$ of a detail of FIG. 19 for permitting the establishment of differences in motive pressure in the device.

Figure 23:
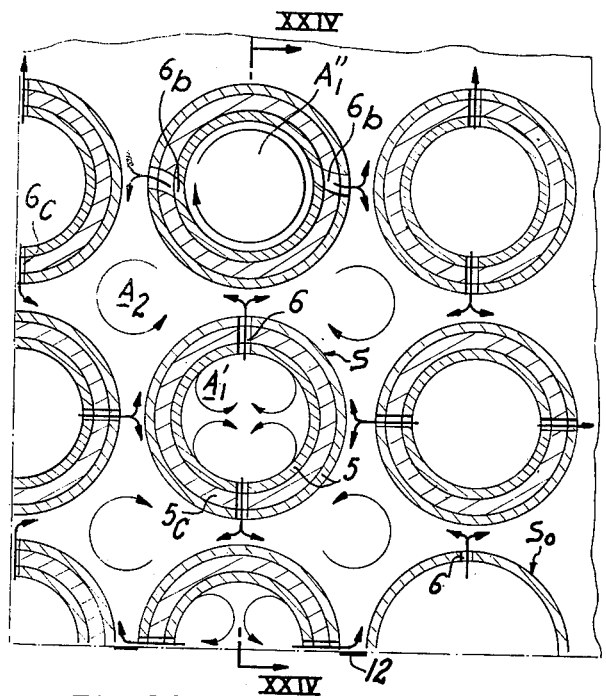

FIG. 23 is a transverse sectional view of a device for the cooling of annular fuel elements in a nuclear reactor.

Figure 24:
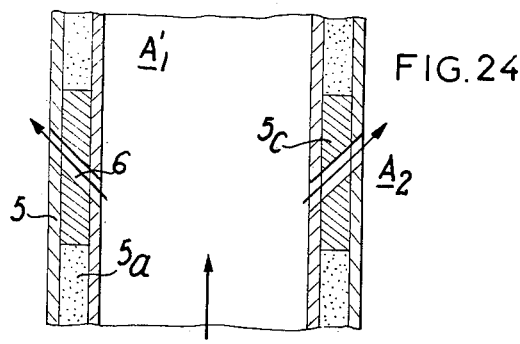

FIG. 24 is a partial section on the line XXIV—XXIV of FIG. 23.

Figure 25:
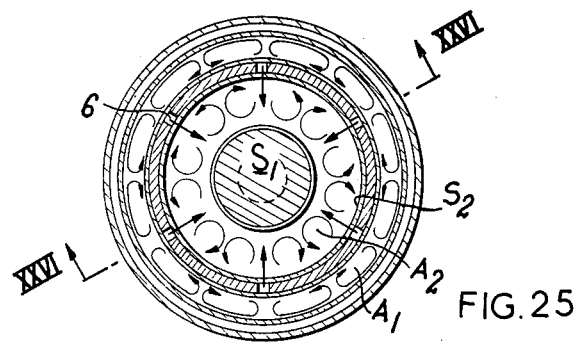
Figure 26:
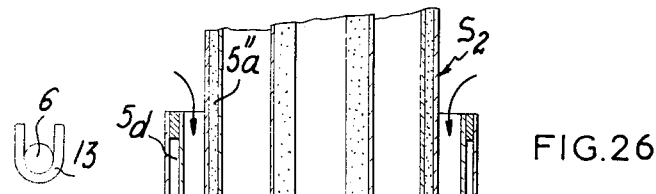

FIG. 25 is a transverse section along the line XXV—XXV of FIG. 26 of a device for the cooling of a complex fuel element where a part of the charge of cooling fluid is made use of for rotating the fluid.

FIG. 26 is a longitudinal sectional view along the line XXVI—XXVI of FIG. 25.

Figure 27:
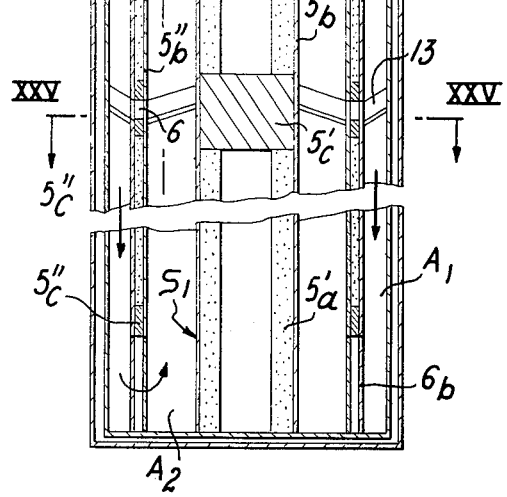

FIG. 27 is a section along the line XXVII—XXVII of a detail of FIG. 26.

Figure 28:
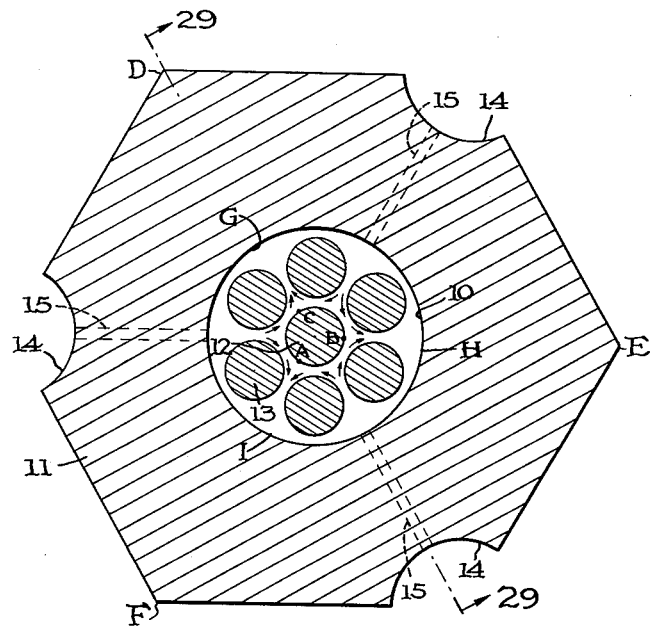
Figure 29:
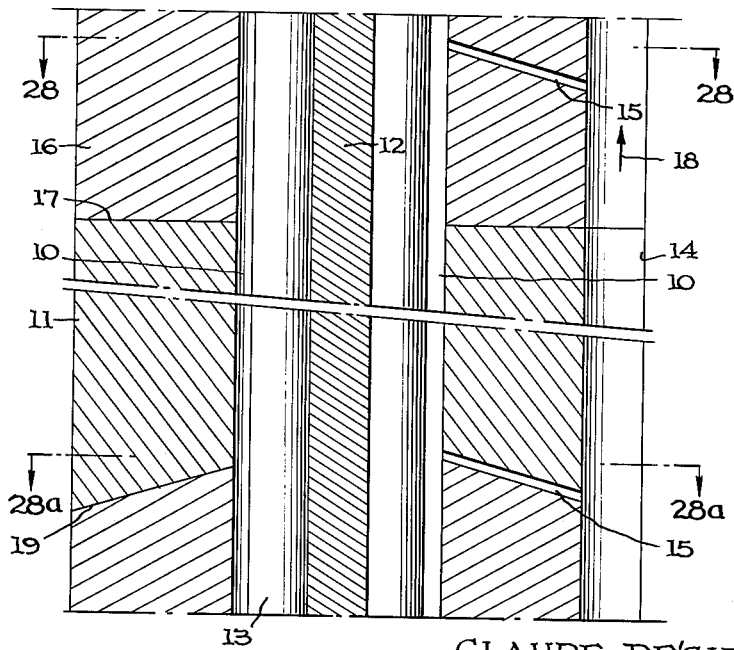

FIG. 28 is a cross-sectional view on the line 28—28 of FIG. 29 of an embodiment of the present invention as applied to the cooling of a nuclear reactor.

FIG. 29 is a cross-sectional view on the line 29—29 of FIG. 28.

FIG. 30 is a view similar to that of FIG. 28 showing a modified form of the canal in FIG. 28 and taken on the line 30—30 of FIG. 32.

FIG. 31 is a view similar to that of FIG. 30 showing the winding of the spacing and supporting wires.

FIG. 32 is an elevational view on the lines 32—32 of FIGS. 30 and 31.

FIG. 33 is a cross-sectional view of a rectangularly disposed nuclear reactor incorporating the present inventive concept.

FIG. 34 is a cross-sectional view of another form of a nuclear reactor incorporating the present inventive concept.

Figure 35:
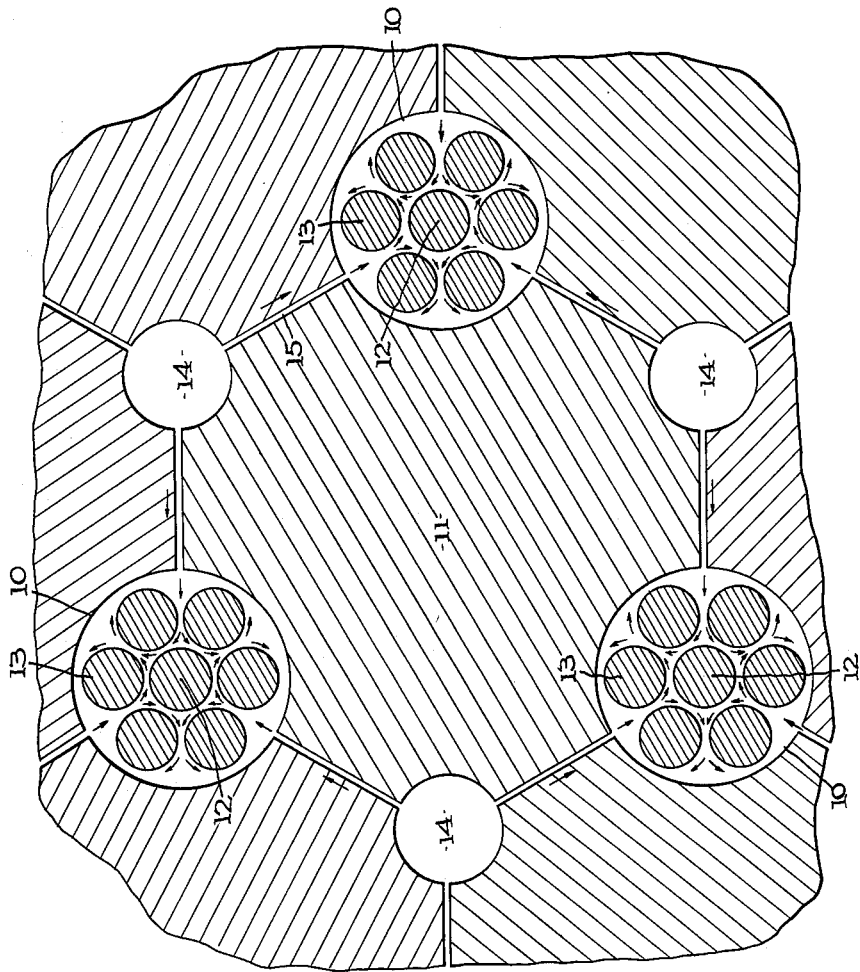
Figure 36:
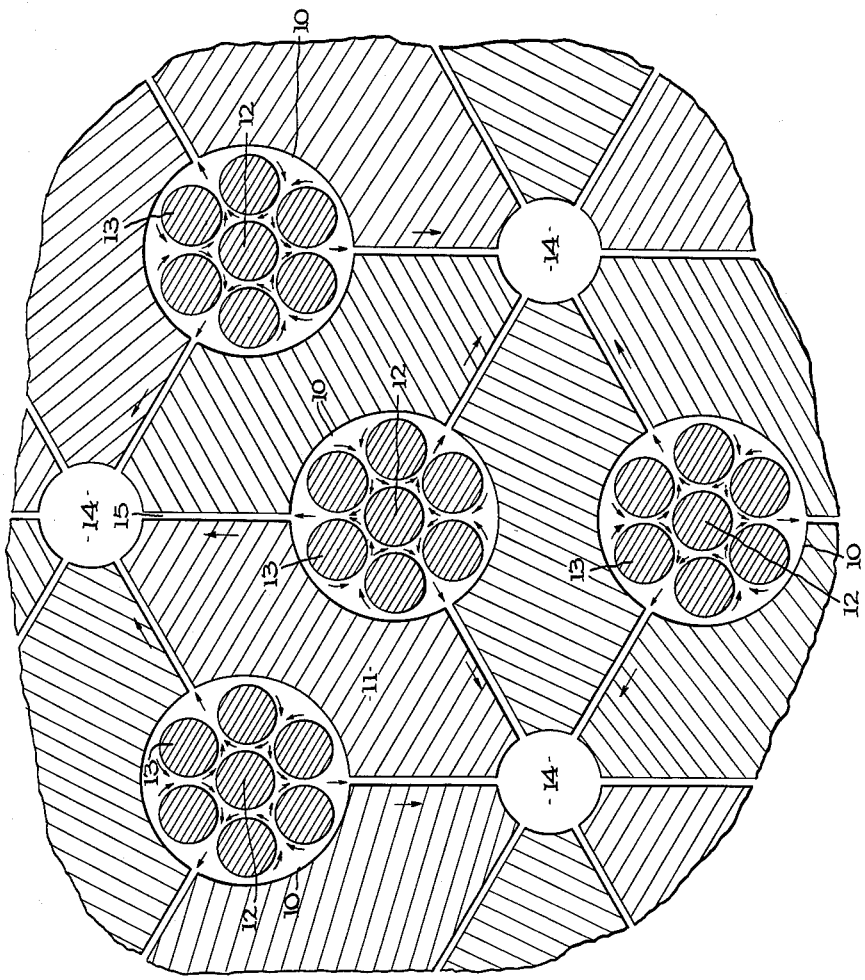

FIG. 35 is a cross-sectional view of a part of a moderator assembly for a nuclear reactor including the embodiment of FIG. 28; and FIG. 36 is a modification of the embodiment of FIG. 35.

Corresponding elements in the different figures carry the same references; the eddy or turbulent movements at the interior of the various elementary chambers have been shown diagrammatically by means of arrows.

In FIGS. 8 and 9, two fragments of the wall 5 limiting four adjacent elementary chambers 1a, 1b, 1c, 1d are shown, the upper fragment 5 being broken away in FIG. 8; this figure shows the bands 7 which are helicoidally curved; for clarity in FIG. 8, only two extreme bands 7a and 7d have been shown, the bands 7b and 7c being only indicated by their outline in a plane perpendicular to the axis of the elementary chambers; the axes of all these bands are parallel.

The form of the bands 7 will be better appreciated from the fact that they can be obtained by torsion of the initially plain bands, which confers on them firstly a cylindrical contour of circular section, and then by flattening of the exterior parts to obtain finally a prismatic form of square section inscribed in the intermediate cylindrical form.

The supply and removal of the fluid are effected directly at the ends of the elementary chambers 1a, 1b, 1c, 1d.

In the case of a nuclear reactor where the walls 5 of the chamber are constituted by the structures containing nuclear fuel in solid form, the bands 7 are advantageously made of the same material as that used for the casing of the fuel; they constitute a source of material which is dangerous from the neutronic point of view; however, they have the advantage of supporting the structures housing the fuel in their relative positions and allowing economy by other means for lateral fixation. Their initial dimensions can be calculated with such manner that, at the temperature of the region, they come into contact with the structures mentioned and furnish them with supports for avoiding deformation of the assembly of these structures as well as possible distension of the casing under the pressure of the products of fission; the material of the casing can thus be employed with a lesser thickness.

FIG. 10 shows a portion of an assembly of cylindrical fuel containers 5a of hexagonal section arranged on a hexagonal framework. These containers 5a are encased by the material 15a'; the portion of the exchange chamber A situated between the containers 5a shown in the figure corresponds to a non-peripheral portion of the assembly and comprises six elementary chambers 1a, 1b, 1c, 1d, 1e, 1f; each of these elementary chambers contains a band 7 curved around the axis of this elementary chamber; each of the bands 7 preferably fills all the space of hexagonal section offered to the fluid and corresponds to an elementary chamber which is delimited on three of its faces by the walls 5a and on the other three by the interfaces common to different elementary chambers. The assembly of the bands 7 determines a stable multi-turbulent region inside the chamber A, the sense of curvature of the bands 7 being reversed when passing from one elementary chamber 1 to the following one; at the same transverse level, the pitches of the curved bands 7 are preferably identical for the different elementary chambers.

As shown in the upper part of FIG. 10, three radial bands 7a, 7b, 7c at 120° to one another can alternatively be disposed inside the elementary chambers 1.

By taking a cylindrical section for the containers 5a, a square assembly can readily be constructed.

In FIG. 11, the two walls 5a are shown which delimit the assembly of adjacent elementary chambers 1a, 1b, 1c; the common face of two adjacent elementary chambers, such as 1a–1b or 1b–1c, is provided with a deflector grille. This grille essentially constituted by deflector plates 8 secured by mountings 8a; the plates 8 are flat bands and are oblique with respect to the axes of the elementary chambers; their ends 8c are preferably bent over so as to rest on the wall 5a parallel to them; all the deflector grilles have a plane of symmetry which is the plane separating two adjacent elementary chambers; the following deflector grille has the same characteristics, but the obliquity of the plates 8 is reversed; this obliquity reverses each time on passing from a plane of separation to the following plane of separation in such a manner that the turbulences set up by the grilles are compatible.

The deflector grilles shown in FIGS. 12 and 13 comprise two longitudinal mountings 8a situated against the walls 5a; the plates 8' and 8" are carried by these mountings; the median line of these plates is oblique as in the previous case with inversion of the obliquity when passing from a plane of separation between adjacent elementary chambers to the following plane of separation; in other words, these plates are alternately inclined towards each elementary chamber; a small part of the flow of fluid is deflected by the plates 8' from the elementary chamber 1b towards the chamber 1a, but the inverse effect is produced owing to the plates 8" so that this parasitic state is negligibly troublesome.

In FIGS. 14 and 15, the different exchange chambers $A_1, A_2, A_3, A_4, A_5, A_6, A_7$ are shown, which are separated by the structures $S_1, S_2, S_3, S_4, S_5, S_6$ constituted at the level of the plane of FIG. 14 by fluid distributor conduits 2a; the conduits are themselves supplied by casings 2' and 2" in which the fluid has a vertical ascending movement; these casings are open at their lower ends and closed at their apexes; the parallelepiped boxes 5 constitute the common wall of the structures S and exchange chambers A; FIG. 15 shows how the fuel 5a is disposed in the structures S, that is to say between the walls of the boxes 5; the orifices or windows 6 in these boxes 5 at the level of the supply channels 2a permit the induction of a stable multi-turbulent state within each of the exchange chambers, the sense of circulation both in these orifices or windows 6 and inside the chambers A being defined as indicated by the arrows in FIGS. 14 and 15.

At the level of the distributor conduits, the walls 5 of the structures S can be constituted by tubular pieces 5b soldered in a sealed manner to the material of the casing 5a' constituting the boxes 5 and containing the fuel 5a as shown in FIG. 16.

In the modification of FIG. 17, two opposed walls of the distributor condiuts 2a are formed by the walls of the boxes 5, while the other two walls are formed by two inserted pieces 5c soldered at 5d to the boxes 5, for example by hot rolling, the operation forming, as with the ordinary soldering in the case of FIG. 16, the sealed casing of the fuel 5a.

At the base of the device (FIG. 15), the first distribution of jets is effected through the windows or series of aligned orifices (6a) taken from the distributor channels 2a' analogously to the distributor channels 2a, but open at the bottom and directly receiving the curent of fluid under excess pressure along the whole length of the channels 2a'.

It is noted that the structures S thus serve at the same time as flat fuel elements and as inlet casings for the fluid supplying the jets, the fissible fuel being interrupted several times in the height of the device to permit location of the distributor conduits 2a.

The heat exchange device shown in FIGS. 18–22 also comprises an assembly of exchange chambers $A_1, A_2, A_3, A_4, A_5, A_6$ and $A_7$ separated by structures $S_1, S_2, S_3, S_4, S_5, S_6$, but here the chambers are alternately receptor and distributor chambers for the fluid; the distributor chambers $A_2, A_4, A_6$ are maintained under excess pressure with respect to the chambers $A_1, A_3, A_5, A_7$; the orifices 6 are suitably disposed (FIG. 18) to permit compatible multi-turbulent movements both inside a chamber such as $A_5$, for example, and in the assembly formed by this chamber ($A_5$) and the adjacent chambers ($A_4$ and $A_6$).

The structures S are essentially constituted by fissile fuel; the fuel 5a is disposed between plane sheets of a casing material 5a'. The apertures 6 (orifices or windows) through the structures are provided in the blocks 5c which are themselves soldered to the casing material 5a' as shown in FIG. 21 or are interposed between this material and the blocks of fuel as shown in FIG. 20, the interposition being effected for example by hot rolling in order to effect a sealed soldering 5b.

The chambers A are open at the bottom and at the top; however, if the conformation of the various main inlets and outlets for the fluid is the same for the chambers $A_1, A_3, A_5, A_7$ as for the chambers $A_2, A_4, A_6$, the pressure will be the same for all the outlets, on the one hand, and for all the inlets, on the other hand, the fluid in the different chambers coming from a single inlet casing 2' or being deflected into a single outlet casing 2"; there is thus no difference in motive pressure between the even-numbered chambers and the odd-numbered chambers and the desired state has not been established; also a priming system 10 is disposed at the inlets 9a of the odd-numbered chambers and the outlets 9b of the even-numbered chambers (FIG. 19), the configuration of which is preferably compatible with the multi-turbulent flow in the chamber in which it is provided.

This system can be constituted at the outlet of the even-numbered chambers by a band 10a having transverse ridges 10a', alternately raised at one edge or at the other, thus providing openings 11 through which the rotating fluid passes so as to constitute the desired loss of charge; the plain arrows in FIG. 18 correspond to a circulation at a higher pressure than the pressure of the circulation of the arrows shown dotted. In other words, at the lower part of the chambers $A_2$, $A_4$, $A_6$, which are somewhat longer towards the bottom, apertures 6a can be provided for obtaining in this part, by means of jets from the supply casing 2', the desired rotation, which is thus amplified by the upper apertures 6 connecting the even-numbered chambers with the odd-numbered chambers.

FIGS. 23 and 24 show the annular structures S separating the cylindrical exchange chambers, such as $A'_1$ or $A''_1$, of the exchange chamber $A_2$ occupying the volume between the structures S. The latter are constituted by a double wall 5 at the interior of which are disposed annuli of fissile fuel 5a separated by inert blocks 5c, the interior of which are traversed by oblique conduits 6 in the general sense of the flow of the fluid; these conduits interconnect, on the one hand, the chambers $A_2$ and $A'_1$, and, on the other hand, the chambers $A_2$ and $A''_1$; the arrangement of conduits 6 such as shown in FIG. 23 allows a stable multi-turbulent movement to be obtained in the chamber $A_2$ and also the beginnings of a stable multi-turbulent movement (with four eddies) in the chambers such as $A'_1$ provided with two series of conduits 6 disposed on opposite diametral generatrices. This movement can be sustained and amplified by disposing means at the lower part of the cylindrical chambers $A'_1$ for obtaining this part of the multi-turbulent movement (casing supplying the jets or deflector obstacles).

The movement of the fluid inside the structures S is mono-turbulent in the exchange chambers $A''_1$, the conduits communicating with the chamber $A_2$ thus being curved conduits 6b discharging perpendicularly of the structures S at the edge of the chamber $A_2$ and tangentially of the structure S at the edge of the chamber $A''_1$.

Structures such as So are also shown in FIG. 23 which are situated at the periphery of the assembly of chambers. Partitions such as 12 limit the extent of the chamber $A_2$ along a zone which will border the neighboring elementary chambers, if such exist.

The external structures S such as So carry conduits 6 identical with those of the structures S and conduits 6o discharging parallel to the external partitions 12, the conduits 6c having a section equal to half that of the conduits 6.

As the external structures Sa can if desired be given the same composition as that of the complete cylindrical structures, a single hydraulic purpose is frequently given to semi-cylindrical or quarter-cylindrical structures, in the absence of fissile material; this is the case with the structure So constituted by a simple wall.

The heat exchange device shown in FIGS. 25, 26 and 27 comprises two exchange chambers $A_1$ and $A_2$ which are annular and concentric; the structure $S_1$ is constituted by a single wall 5b' containing several annular blocks of fuel 5a', separated from one another by blocks 5c'; the structure $S_2$ separating the chambers $A_1$ and $A_2$ is constituted by a double envelope 5b'' containing, in a manner analogous to the structure $S_1$, annuli of fuel 5a'' separated by annuli 5c''; the assembly is surrounded by a double cylindrical envelope 5d; the cooling fluid is supplied at the upper part of the exchange chamber $A_1$; it circulates from top to bottom and, owing to the longitudinal windows 6b, it penetrates into the exchange chamber $A_2$ and there circulates from bottom to top; the jets issuing from the windows 6b create in the chamber $A_2$ a multi-turbulent state which is maintained by the jets delivered by the conduits 6 provided, by way of the structure $S_2$, in the annuli 5c'' and aligned with the windows 6b. A stable multi-turbulent flow is thus established though less readily than in the chamber $A_1$; deflector members constituted by troughs 13, the section of which is in the form of a U as shown in FIG. 27, are disposed partly between the envelope 5d and the structure $S_2$ and partly between this structure and the structure $S_1$; there is thus the benefit of the dynamic overpressure in the chamber $A_1$ and a flow effect in the chamber $A_2$ which increases the difference in pressure utilizable for the formation of jets traversing the conduits 6; the troughs 13 can advantageously provide for centering of the structures $S_1$ and $S_2$ with respect to the external envelope 5d.

As is apparent from the above, the present invention relates to an exchange procedure in which exchange capacity is obtained by a plurality of circular or rotating streams each located in a basic volume having a defined shape, the sense of rotation of each stream being inverse to that of the next adjacent stream and each being created and/or maintained by the action of jets or sheets entering tangentially in the appropriate basic volume.

Deflector means may be used to create and/or maintain the circular streams.

The exchange surfaces particularly for heat exchange are disposed at the periphery of the several basic volumes forming in part these basic volumes.

When the fluid circulating in the different basic volumes is in two phases it is practically indispensable for the best heat exchange that the denser phase contact the heat exchange surfaces and therefore at the exterior of the rotating or circular streams.

This is not the case when the fluid is in single phase, liquid or gaseous, and the heat exchange surfaces can then be arranged otherwise than along the walls of the exchange capacity or capacities.

The embodiments of the present invention shown in FIGS. 28-36 obtain heat exchange between a liquid or gaseous phase and exchange elements at least certain of the exchange elements being disposed within basic volumes of exchange following substantially the central zone of these basic volumes.

These exchange elements are heat exchange elements and may contain combustible nuclear fuel undergoing fission within a nuclear reactor. These elements can be bars of nuclear fuel, sheathed or unsheathed, providing heat to the cooling fluid of the reactor.

FIGS. 28-36 relate to heterogeneous nuclear reactors having a solid moderator and having cooling canals either vertically or horizontally disposed in the moderator and cooled by a gas or liquid refrigerant such as carbon dioxide, water and the like. A liquid metal can be used as the cooling liquid.

The concept of FIGS. 28-36 also applies to heterogeneous nuclear reactors in which the cooling fluid is also the moderator with the coolant circulating as a plurality of rotating or circular streams of coolant with the fuel arranged, at least in part, in the central zone of groups of rotating or circular streams in the basic volumes as in the case of reactors using light or heavy water under pressure. The present concept is not used in reactors employing a boiling liquid since the vapor phase would be in contact with the fuel elements which would reduce the efficiency of the thermal exchange.

In accordance with a particular embodiment thereof, the present invention relates to a heterogeneous nuclear reactor in which the canals are found in the solid moderator with each canal providing a volume of exchange in which are located a plurality of rotating or circular streams of cooling fluid. Fuel rods are placed along the central zone of each volume of exchange or canal and the means for obtaining and/or maintaining the plurality of rotating streams of cooling fluid comprise sheets or jets of coolant entering through orifices situated in the walls of the moderator surrounding the volume of exchange. These orifices may be the openings of conduits leading to the interior of the moderator from canals distributing the fluid for the jets or sheets and located between the cooling canals.

The fluid may also escape from the cooling canals into collector canals through an intermediate system of orifices and conduits.

A combination of these two embodiments can be applied to the same cooling canal. It is advantageous in a nuclear reactor to use the first embodiment for certain cooling canals and to use the second embodiment for other canals so that it is possible to adjust cooling to the radial curve of flux variation.

Generally speaking the position and arrangement of the jets or sheets and conduits follows the principles discussed above.

The conduits or canals, either distributors or collectors, are formed by casting in the solid moderator elements or formed by grooves formed in certain adjacent faces of the elements.

In accordance with the invention, the means for obtaining and/or maintaining the plurality of rotating streams of cooling fluid can also be deflectors. Deflector-type grills and helical bands around the thermal exchange elements can be used. These helical bands can be a simple wire. The described indispensable conditions for the arrangement of the several circular or rotating streams of cooling fluid must be maintained and particularly the directions of rotation.

An important part of the invention is the use of bands or wires wound spirally around the exchange elements to maintain the position of the different exchange elements in the basic volume. In the case of use with heterogeneous nuclear reactors these bands or wires pass around and maintain the position of the fuel bars.

The bands or wires are wound in a helix, at constant or changing pitch, around each element. Each band or wire after following a part of a helix around an exchange element, such as a fuel bar, then follows another fraction of a helix around a neighboring element with the change from one element to the other taking place at the common boundary of the basic volumes containing the two elements.

When the wire or band passes from one element to another, the direction of turn should be changed but the pitch or longitudinal law of evolution established on the first element is maintained.

The elements of exchange are located in each basic volume and are formed to create and maintain the plurality of rotating or circular streams of coolant. In one particular embodiment for a nuclear reactor, the fuel elements include helical bands arranged in the cooling canals in the moderator. The trace of these bands in a plane normal to the mid line of the several basic volumes extends to the surface of these volumes to facilitate the location of the fuel elements.

The cooling canals in the solid moderator, containing the fuel elements in the different basic volumes of the canals, may have a lobed cross section having circular portions corresponding to a part of the shape of each basic volume and, in combination with the helical bands or wires, holding the fuel elements in place. This arrangement is particularly important because it maintains the relative positions of the fuel elements with respect to the lines of openings through which a part of the cooling fluid is introduced or withdrawn. The fact that a circular form is given to a part of the contour of each basic volume assists in the establishment and maintenance of the plurality of rotating or circular streams of coolant.

In FIG. 28 a cooling canal 10 of a nuclear reactor utilizing cooling gas is provided within moderator assembly 11 which is made of graphite. Canal 10 contains seven fuel bars, a central bar 12 and six peripheral bars 13 arranged uniformly around central bar 12. All of the bars have the same cross section. Moderator assembly 11 is a prism in right angle section along the axis of canal 10. Three distributor canals 14 for the cooling gas are arranged along apices of the prism the length of three equidistant corners. Distributor conduits 15 are disposed in radial planes and spaced 120° from each other to connect distributor canals 14 to cooling canal 10 and permit the cooling gas to flow over the group of seven bars following prescribed frontal zones between the bars. This arrangement provides an exchange volume having six elementary volumes in which the patterns of the rotating or circular streams of coolant are similar. Each of these elementary volumes contains a fuel bar 13 in its central part.

Central fuel bar 12 can be replaced by a distributing duct for the cooling gas and communication between the interior of this duct and the six basic volumes is then provided by openings let therein along the generatrices A, B and C.

Figure 1:
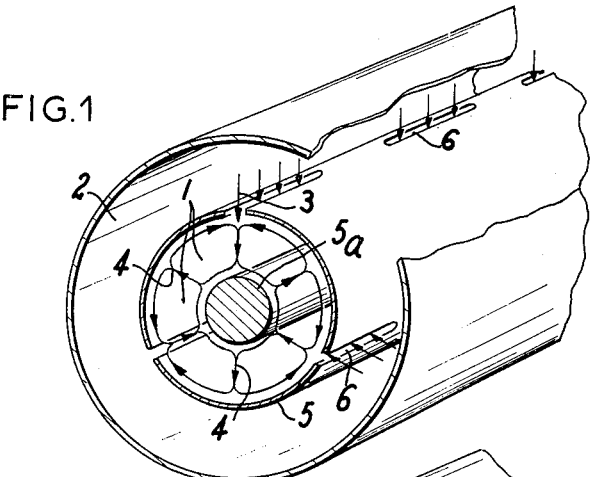
FIG. 1 shows a broken-away view of an annular exchanger in which a system of six eddies is established within six elementary chambers 1 by means of a system of windows 6 aligned on three generatrices.

Canal 10 can be provided with cooling gas either totally or in part by distributor canals 14 and by the central duct. Coolant can also be provided from one of the ends of canal 10. The movement of the plurality of rotary or circular streams of coolant can be obtained by means of jets or sheets directed into the exchange volume or by means of jets or sheets certain of which discharge into the exchange volume while others discharge therefrom. In this last embodiment, collector canals can be provided along the apices D, E and F of FIG. 1 with collector conduits connecting orifices in surfaces G, H and I of the basic volume to these collector canals.

Figure 2:
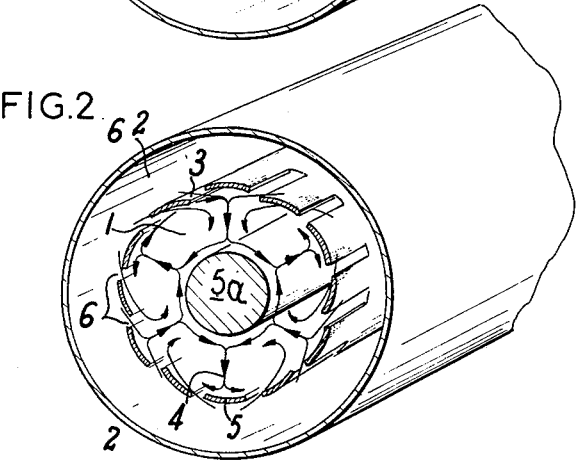
FIG. 2 shows a variation of FIG. 1, the creation of a system of six eddies being established by means of a system of slots or louvres 6 which are symmetrical with respect to three radial planes.

FIG. 2 shows a special construction for the moderator assembly 11 and for conduits 15. At level 28—28 this assembly is formed of a hexagonal block 16 in which distributor conduits 15 are formed. The several blocks 16 are joined at surfaces 17 perpendicular to the axis of canal 10. Conduits 15 are inclined in the direction of flow represented by arrow 18 in distributor canals 14 and this is also the direction of total flow in canal 10. At level 28a—28a the several hexagonal blocks 16 are joined on truncated surfaces 19. At least one of the two faces of this surface are provided with three grooves which form at this level three inclined distributor conduits 15.

At a same transverse level each block 16 can be made of three bricks of lozenge shape fittings snugly together. Conduits 15 are then perferably grooved in the common interfaces of adjacent ones of the several blocks 16.

Figure 3:
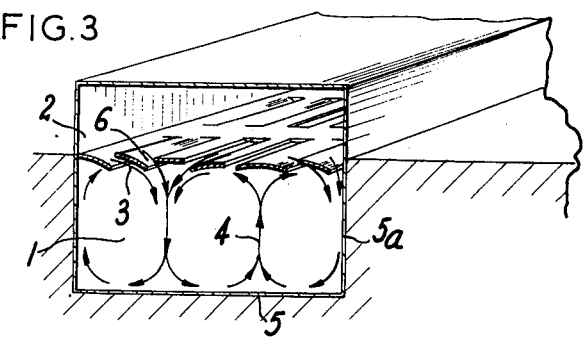
FIG. 3 shows an exchanger of the rectangular type, divided into three elementary chambers 1, in which a system of three eddies is established.

The bundle of fuel bars shows in FIGS. 30, 31 and 32 include seven identical bars 20, 21, 22, 23, 24, 25 and 26. The six peripheral bars establish six basic volumes or whirlpools. A wire 27 is wound helicoidally on the assembly of three bars 21, 23 and 25. In projection on a transverse plane, wire 27 has the shape of a closed ring in a form of a three branched clover leaf 30. As seen in FIG. 3, wire 27 engages part of bars 20, 22, 24 and 26. Another wire 28 is coiled helicoidally but in opposite direction to wire 27 on the assembly of three bars 20, 22 and 24 and in projection has contour 29 differing from contour 30 by a rotation of 60°. Flow of cooling fluid in canal 31 in moderator 32 and containing fuel bars can be achieved solely from one end of the canal. The rotating or circular streams of coolant, following the arrows in FIGS. 30 and 31, are obtained by deflection of the fluid by wires 27 and 28. This turbulence can also be obtained by three series of canals 15, each opening through an interface in the basic volumes or by a combination of these means. The cooling fluid is discharged in total or in part at an extremity of the canal or through discharge conduits 33 located at the right of the appropriate interfaces. The cross section of canal 31 is lobed and comprises circular portions 34 corresponding to a part 35 of the shape of each basic volume. The special form of this cross section and also of wires 27 and 28 centers and maintains the bundle of bars within canal 31. The spaces left between the wall of the canal and the adjacent bars and also the spaces left between the different adjacent bars have dimensions on the order of the thickness of wires 27 and 28.

The interior of the nuclear reactor can contain, as is shown in FIG. 33, assemblies of fuel bars, cooling fluid and moderator in which the fuel elements 36 are disposed within each of nine basic volumes 37 of each of six cooling canals 38a and 38b of very elongated rectangular form. Canals 38a are under slightly greater pressure than the three canals 38b. These canals are separated from each other by plates 39 of solid moderator material or of a combination of fuel and moderator material for example, uranium carbide and graphite. The assembly is shaped as a parallelepipedal box 40 made of moderator material such as graphite.

Plates 39 are pierced by openings 41 delivering jets of cooling fluid in the canals 38b from canals 38a. Fuel elements 36 are cylindrical bars which may or may not be surrounded by wires 42 each wire being wound helicoidally around a given bar or around an assembly of bars, the wire following a portion of a helix successively around each of the bars of the assembly. The direction of curvature of wires 42 and the placing and orientation of orifices 41 are such that the circular or rotating streams of coolant in all the basic volumes 37 are compatible, as seen in FIG. 33, where the direction of curvature of wires 42 are shown by arrows 43.

In the embodiment of FIG. 34, the assembly of fuel bars, cooling fluid and moderator includes plates 44 of solid moderator material, for example graphite, which are parallel and spaced opposite each other along their faces aa and bb. These faces are recessed to provide cooling canals 45 in which are located fuel elements 46a, 46b and/or 46c forming a part of the moderator. Semi-cylindrical grooves 47 are formed in faces ab of plates 44 for the cooling fluid which is forced into cooling canals 45 through distributor conduits 48 and orfices 49.

Two beads 50 and 51 are coiled in helical form around each of fuel bars 46a. Each fuel element 46b includes a helicoidal band formed on or mounted on the sheath of the bar. These fuel bars are therefore quite analogous to those shown in FIG. 33, particularly bars 46c. In every instance the direction of curvature is inverse when passing from one fuel bar to the next.

In the modification of FIG. 28 shown in FIG. 35, the cooling canals 10 are arranged on three equidistant apices of moderator block 11 of hexagonal prismatic section. Canals 10 contain a central fuel bar 12 and six peripheral fuel bars 13. The three other lateral apices of block 11 contain canals 14 which are distributor canals providing flow of coolant in the direction of the arrows in FIG. 35. These canals may also be collector canals. Conduit 15 connect canals 14 to cooling canals 10.

In the modification of FIG. 9 the cooling canals 10 are arranged in the common apices of three adjacent prisms of lozenge shaped section in moderator 11. Canals 14 are either distributor or collector canals as shown by the arrows in FIG. 36. Canals 15 are radially directed and can be formed through a hexagonal monoblock prism 11 instead of being arranged along the common faces of the lozenge shaped prisms forming the hexagonal prism.

In these embodiments the bars in canals 10 may or may not be surrounded by coiled wires or may or may not have raised helical beads on their surfaces and the cross section of the canals can either be lobed or plane.

Changes in or modifications to the above described illustrative embodiments of the present invention may now be suggested to those skilled in the art without departing from the present inventive concept. Reference should therefore be had to the appended claims to determine the scope of the present invention.

What is claimed is:

1. In a process for heat exchange through convection between a fluid and at least one exchange wall parallel to given line by renewing said fluid when it comes in contact with said walls, the steps of directing flow streams of said fluid normally to said wall substantially toward lines of said wall belonging to a first group of lines parallel to said given line and substantially equidistant and removing said fluid normally from said wall substantially away from lines of said wall belonging to a second group of lines parallel to said given line and located on the surface of said wall midway between the lines of the first group, a part of said fluid removed adjacent a wall from any line of the second group being helically deflected and returned to said wall, for constituting a part of the fluid directed toward at least one line of the first group adjacent said line of the second group of lines, a part of said fluid which is directed into the vicinity of said wall towards said line of the first group of lines and deflected along said wall towards said line of the second group of lines comprising a part of said fluid removed from said line of the second group of lines, whereby the fluid flow is split into saparate veins each bordered by parts of said wall and parts of the periphery of an adjacent vein having an opposite direction of rotation.

2. A process as described in claim 1, wherein said fluid supplied by streams and directed towards each of said walls is a liquid, and sufficient heat is provided to said wall means for vaporizing said liquid.

3. A process for heat exchange by convection between a fluid and wall means parallel to a given line, comprising: creating a general flow of said fluid parallel to said line and dividing all of said general flow into a plurality of adjacent helical streams having across sections of similar form and dimensions in any plane orthogonal to said line, each of said streams having a rotative movement along and about an axis parallel to said line, each of said streams being in heat transfer relation with said wall means and two adjacent streams contacting and deflecting each other on part of their peripheries whereby the directions of rotation are opposite in adjacent streams.

4. In an exchange apparatus for a fluid, an extended enclosure disposed about a central axis, and wall means parallel to said axis, means for dividing said fluid into a plurality of elementary adjoining veins, each of said veins having a central line substantially parallel to said axis, said means rotating each of said elementary veins around its central line with inverse direction of rotation between adjacent veins, said means including a conduit, a plurality of venetian shutter openings in said wall means opening tangentially therethrough between said conduit and said enclosure, means for providing a fluid pressure in said conduit different from that in said enclosure, said openings being disposed in substantially equidistant lines parallel to said axis symmetrically with respect to the contacting portions of two adjacent veins.

5. In an apparatus for heat exchange between a fluid and wall means, an elongated enclosure disposed about a central axis, said wall means being parallel to said axis, means for circulating a flow of said fluid parallel to said axis and second means for dividing said fluid flow into a plurality of elementary adjoining veins, each vein having a central line substantially parallel to said axis, said second means rotating each of said veins around its central line, the direction of rotation of each of said veins being inverse to the direction of rotation of the adjacent vein, said second means comprising helically twisted bands within said enclosure, the long axes of said bands being substantially parallel to said first axis and being substantially equidistant, each of said bands being associated with one of said axes, the distance between an axis and the periphery of the associated band being substantially equal to half the distance between two consecutive axes, the pitch of the helices of the bands along two adjacent axes being equal and opposite.

6. In an apparatus for heat exchange between a fluid and part at least of wall means parallel to a general direction and defining an extended enclosure, means for circulating a flow of said fluid substantially parallel to said direction, and second means for dividing all of said fluid flow into a plurality of adjoining streams contacting each other over parts of their peripheries, said second means rotating each of said streams about an axis parallel to said general direction, said second-named means consisting of a plurality of sets of stationary flow deflector means each of said sets being associated with one of said streams, said second-named means associated with a pair of adjacent streams being symmetrical with respect to the contacting parts of their peripheries and located along a substantially helical path, whereby the directions of rotation in adjacent contacting streams are opposite.

7. In a nuclear reactor heat exchange chamber, a plurality of cylindrical fuel elements located parallel to each other at the apexes of a regular lattice polygon, means for circulating a fluid in a general direction parallel to said fuel elements and a plurality of helically twisted band deflectors each located along the symmetric axis of adjacent elements located at the apices of the basic pattern of the lattice, two adjacent band deflectors having opposite pitches whereby the general flow of fluid is subdivided in a plurality of parallel adjacent streams each associated with a band deflector and each contacting the fuel elements and the adjacent streams at its periphery, the velocities in the contacting portions of two adjacent streams having the same directions and intensities.

8. In an exchange apparatus for heat exchange between a fluid and part at least of wall means forming an extended enclosure, said wall means being disposed parallel to an axis of said enclosure, means for dividing said fluid in said enclosure into a plurality of elementary adjacent streams contacting each other along part of their peripheries and each having a central line substantially parallel to said axis, said means impressing on each of said streams a rotating movement about said axis, the rotation of a stream being inverse to the rotation of the adjacent stream, said means including a conduit and a plurality of openings in said wall means for communication between said conduit and said enclosure, means for providing in said conduit a fluid pressure different from that in said enclosure, said openings being disposed along substantially equidistant lines substantially parallel to said axis, the distance between two consecutive of said equidistant lines being substantially the transverse dimension of one of said elementary streams, said enclosure being a cooling channel in a heterogeneous nuclear reactor, nuclear fuel elements arranged in the axial zones of said streams and coiled bands surrounding said fuel elements forming deflectors in the direction of rotation of said streams of fluid.

9. In an exchange apparatus for heat exchange between a fluid and part at least of wall means forming an extended enclosure, said wall means being disposed parallel to an axis of said enclosure, means for dividing said fluid in said enclosure into a plurality of elementary adjacent streams contacting each other along a part of their peripheries and each having a central line substantially parallel to said axis, said means impressing upon each of said streams a rotating movement about said axis, the rotation of a stream being inverse to the rotation of an adjacent stream, said means including a conduit and a plurality of openings in said wall means for communication between said conduit and said enclosure, means for providing in said conduit a fluid pressure different from that in said enclosure, said openings being disposed along substantially equidistant lines substantially parallel to said axis, the distance between two consecutive ones of said equidistant lines being substantially twice the transverse dimension of one of said elementary streams, said enclosure being a cooling channel in a heterogeneous nuclear reactor, nuclear fuel elements arranged in axial zones of said streams, a plurality of elementary volumes in said cooling channel each of said elementary volumes containing one of said streams, each of said fuel elements being arranged axially in one of said elementary volumes, a solid moderator for the reactor, a plurality of juxtaposed hexagonal prism-shaped blocks forming said moderator, said cooling channel being disposed in the axis of said prisms and fluid distributing and collecting channels formed in apices of said prisms.

References Cited by the Examiner
UNITED STATES PATENTS

| | | | |
|---|---|---|---|
| 1,301,055 | 4/19 | Humberger | 233—11 |
| 2,703,701 | 5/46 | Simpelaar. | |
| 2,708,656 | 5/55 | Fermi et al. | 176—41 |
| 2,709,575 | 5/55 | Sorensen | 257—1 |
| 2,726,036 | 12/55 | Gilson | 233—11 |
| 2,782,158 | 2/57 | Wheeler | 176—59 |
| 2,869,830 | 1/59 | Cox | 257—1 |
| 3,034,769 | 5/62 | Bertin et al. | |
| 3,047,483 | 7/62 | Polak | 176—28 |
| 3,074,874 | 1/63 | German et al. | 176—47 |
| 3,109,485 | 11/63 | Fortier. | |

CARL D. QUARFORTH, *Primary Examiner.*